ём

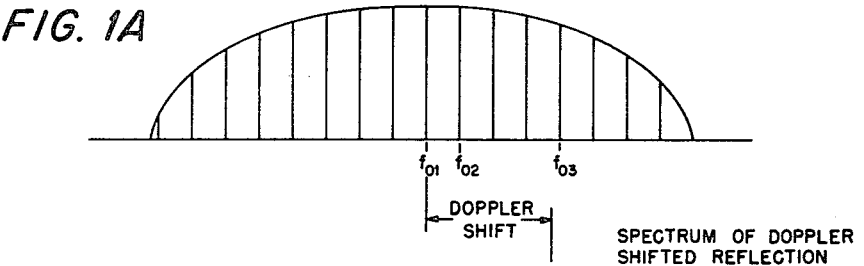
FIG. 1A  SPECTRUM OF TRANSMITTED TRAIN
FIG. 1B  SPECTRUM OF DOPPLER SHIFTED REFLECTION
FIG. 5A  RECEIVED TRAIN
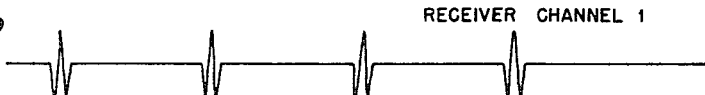
FIG. 5B  RECEIVER CHANNEL 1
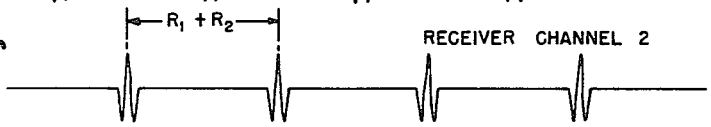
FIG. 5C  RECEIVER CHANNEL 2

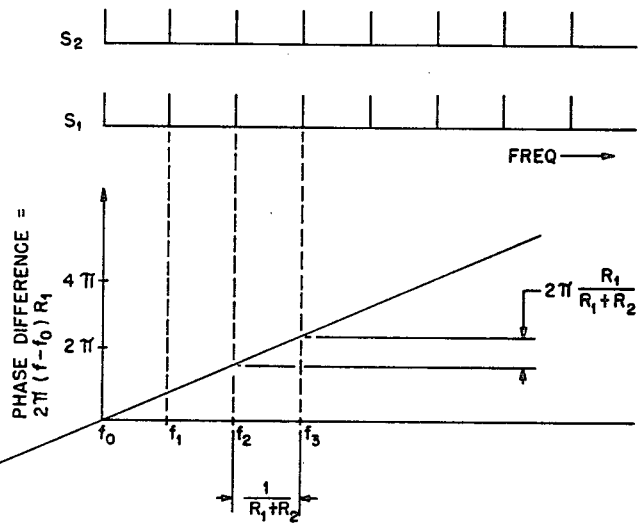
FIG. 2A
FIG. 2B
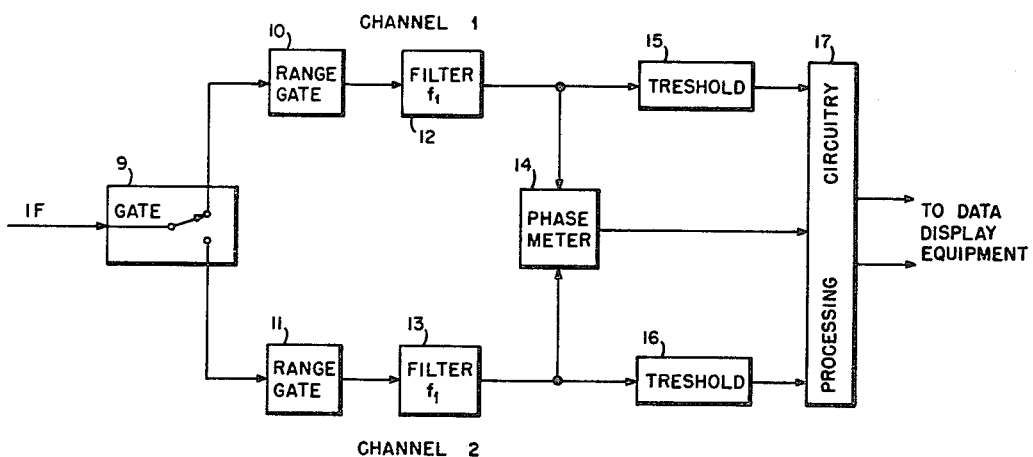
FIG. 3

United States Patent Office 3,500,400
Patented Mar. 10, 1970

3,500,400
LOW PRF PULSE DOPPLER RADAR WITH REDUCED DOPPLER AMBIGUITIES
Hermann H. Woerrlein, Dunkirk, Md., assignor to the United States of America as represented by the Secretary of the Navy
Filed Oct. 30, 1968, Ser. No. 771,794
Int. Cl. G01s 9/44
U.S. Cl. 343—9         6 Claims

ABSTRACT OF THE DISCLOSURE

A radar system for eliminating Doppler ambiguities if unambiguous range is available. The system consists of impressing two different modulations on one carrier, the modulations being such that they can be separated in the receiver. The phase difference between the separated waveforms is measured to arrive at the Doppler information.

Statement of Government interest

The invention described herein may be manufactured and used by or for the Government of the United States of America for governmental purposes without the payment of any royalties thereon or therefor.

BACKGROUND OF THE INVENTION

The invention relates generally to pulse burst or pulse Doppler radar systems. The outstanding advantage of such systems is their capacity of yielding combined range and Doppler information associated with very small self clutter residues of the ambiguity function. However this advantage is offset by the fact that target Doppler information may be ambiguous due to the numerous lines in the signal spectrum. One method of achieving unambiguous Doppler is to employ a high PRF, however such a system introduces range ambiguities. Still another method would be to use a longer duration pulse and process the received signals through a filter bank. This method can function properly only if the Doppler shift is at least comparable to or greater than the spectral width of the transmitted signal. Thus such a system would not be practical in aircraft detection systems since the Doppler shift is not sufficiently great. The above discussion points out the need for a system which provides unambiguous range and Doppler information.

STATEMENT OF OBJECTS OF THE INVENTION

An object of the invention therefore is to provide a pulse Doppler radar capable of measuring Doppler shifted frequencies unambiguously.

A further object is to provide a system capable of monitoring targets moving above a preselected velocity.

Another object is to provide a system which is reliable and simple in design.

SUMMARY OF THE INVENTION

The present invention achieves unambiguous Doppler in a low PRF radar system by recognizing that the phase difference between corresponding lines of two pulse trains differing only by their separation in the time domain is a linear function of the separation of the lines under consideration with respect to the lines corresponding to the carrier. Thus the system processes two pulse trains each in a separate channel and measures the phase difference between the same lines in each of these trains. The particular line in each spectrum being monitored is known by design of the filters and the transmitter. One can determine the carrier frequency of the pulse trains by measuring the phase difference and further determining from the phase difference the separation between the carrier and the known value of the filter center frequency. The Doppler shift will then be equal to the difference between the carrier frequency of the received signal and the carrier of the transmitted signal.

A more detailed explanation of the invention will follow with reference to the drawings.

FIGS. 1A–1B show the spectral makeup of transmitted and reflected pulse radar signals.

FIGS. 2A–2B are graphical illustrations of the theory of operation of the invention.

FIG. 3 is a block diagram of the essential parts of the invention.

FIGS. 5A–5C are waveform diagrams showing the timing sequence of signals in the invention.

Figure 4:
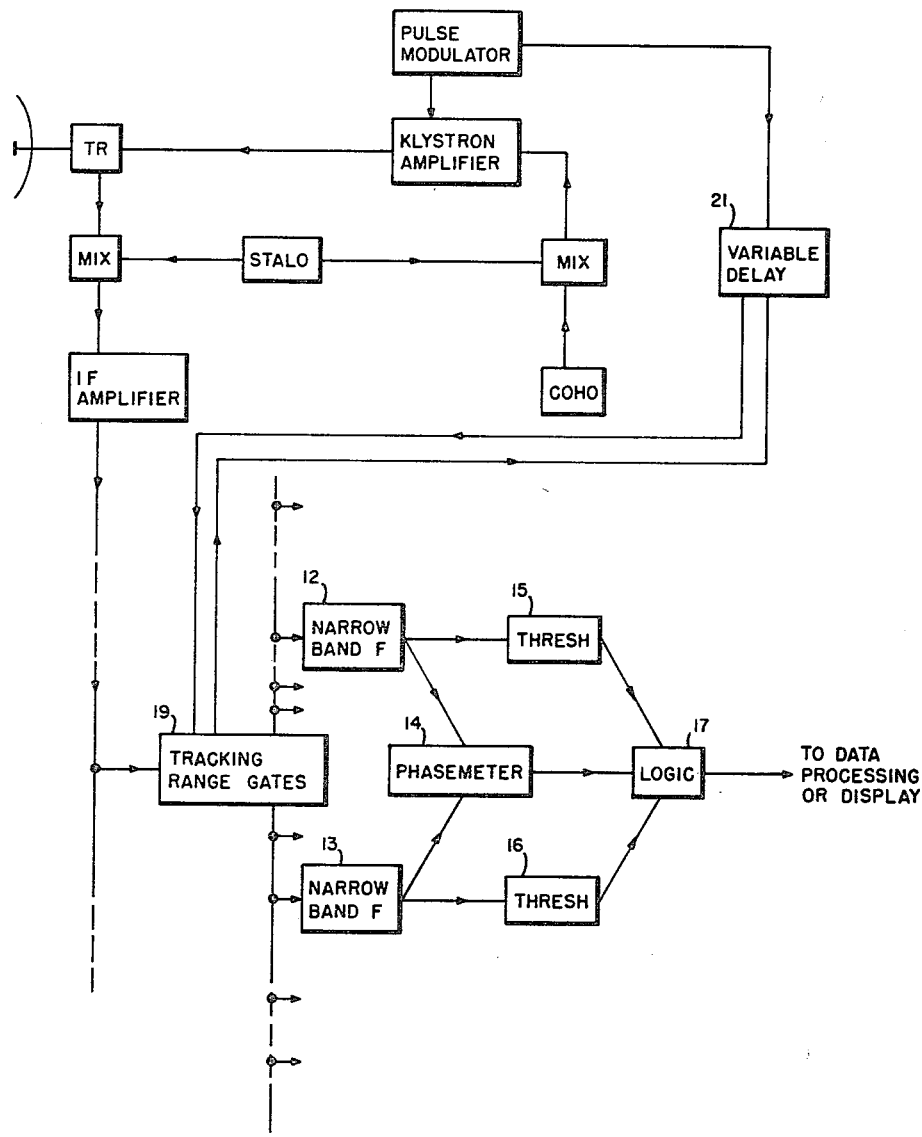
FIG. 4 is a more complete operational block diagram of a radar system incorporating the invention.

In FIG. 1 there are shown the generalized spectra of a transmitted radar pulse train and its reflection. The transmitted spectrum shown in FIG. 1A is composed of lines separated in frequency by intervals equal to the radar PRF, the same being true of the reflected spectrum shown in FIG. 1B. The lines near the carrier $f_{01}$ are of an amplitude approximately equal to that of the carrier. The carrier of the return Doppler shifted spectrum $f_{03}$ is shifted from that of the transmitted spectrum. This shifting of carrier frequency is a function of target velocity and commonly termed, Doppler shift. Due to the multiplicity of spectrum lines it is not possible to identify the carreir of the return wave unambiguously. Each line of the spectra has a phase term associated with it which can be measured if a phase reference signal is provided in the proper way. The return Doppler shifted spectrum shown in FIG. 1B is the result of reflections of a single pulse train. By using a transmitter signal composed of two distinct pulse trains at the same PRF and propagated on the same carrier, an additional spectrum identical to FIG. 1B but rotated in phase will be created. The two center portions of such spectra are shown in FIG. 2A. A pulse waveform suitable for accomplishing the function as described above is shown in FIG. 5(A).

FIGS. 5B and 5C show how the return pulses are divided into two channels. FIG. 5B could represent the return pulses directed into channel 1 of FIG. 3 while FIG. 5C in that case would illustrate the input to channel 2. It is noted that FIGS. 5B and 5C represent the pulse trains which are associated with the spectra illustrated in FIG. 2A with the time displacement $R_1$ plotted along the horizontal axis. The carrier on whcih the pulses of FIG. 5A are modulated is constant and known by design of the transmitter. The carrier upon which the return pulses depicted by FIGS. 5B and 5C are modulated, will be shifted from the transmitted carrier by an amount proportional to target velocity and commonly called the Doppler frequency. It is seen from FIGS. 5A–5C that the return pulse train present in one channel has a constant repetition frequency equal to that of the pulse train in the other channel. The time intervals between successive pulses of the transmitted signal are different as represented by $R_1$ and $R_2$ of FIG. 5A. The pulse rate frequency of each of the pulse trains in the two channels is given by the reciprocal of $R_1$ plus $R_2$. The switching of successive pulses along separate receiver channels is accomplished by means of an electronic gating circuit 9. A conventional phase meter or a ring modulator can be used to arrive at a signal proportional to the difference in phase between the signals in filters 12 and 13.

Having described how the spectra of time displaced signals shown in FIG. 2A are produced in the receiver, a description of how the invention utilizes these waveforms to obtain Doppler will now be given with reference to FIGS. 2(A) and 2(B) and FIG. 3. A mathematical analysis will reveal that the phase difference between the same line of the two spectra, for example $f_2$, is a linear function of the separation between that line and the carrier frequency of the reflected spectra. More accurately this phase difference can be expressed by the equation $$\phi = 2\pi (f-f_0) R_1$$

where $f$ is the frequency of the line being investigated, $f_0$ is the frequency of the carrier, and $R_1$ is the time shift of one burst with respect to the other. As previously mentioned, the time shift $R_1$ may be the only distinction between the two bursts, both being received together at the same frequency where the target is moving at a constant velocity. The lines of the spectra of FIG. 2A as noted above are separated by the PRF of the pulse train which from FIGS. 5B and/or 5C can be seen to be equal to $$\left(\frac{1}{R_1+R_2}\right), \text{ thus } f-f_0 = N\left(\frac{1}{R_1+R_2}\right)$$

and substituting into the previous equation $$\phi = N 2\pi \left(\frac{1}{R_1+R_2}\right)$$

Reference is made to Woodward, P. M., "Probability and Information Theory with Application to Radar," 2nd ed., Chap. 2 where a more complete mathematical treatment can be found. FIG. 2B is a graph of the above equation for $\phi$. It can be seen from FIGURES 2A and 2B that the phase difference between the same line in each of the time displaced spectra is a linear function of the separation between that line and the carrier of the spectra.

To further explain how the principle involved is utilized to arrive at Doppler information, let us assume that we have generated the two spectra of FIG. 2A in separate channels of a receiver by the method previously described, thus the spectrum $S_1$ of FIG. 2A would be present in one channel of FIG. 3 while spectrum $S_2$ would be present in the other. We could place a range gate and a filter or a matched filter in each of the two channels to monitor the same line in both spectra, for example, $f_1$. It is noted that a range gate and filter combination is electrically equivalent to a matched filter. The next step would be to ascertain the phase difference between the line $f_1$ in one channel and the line $f_1$ in the other channel. Knowing the phase difference, the separation between $f_1$ and the unknown carrier can be ascertained. Thus the carrier can be identified. This would correspond to the $f_{03}$ of FIG. 1. Since the carrier of the transmitted signal is known by design it is possible to determine the Doppler shift between the return and transmitted signals.

One further problem very practical in nature must be avoided in utilizing the invention. From the graph of FIGURE 2, it can be seen that the slope of the function can be selected to be many different values. However if the slope is such that the phase differences between the lines near the carrier are multiples of $2\pi$, it would be impossible to recognize one from the other. This is so because conventional test equipment cannot discern the difference between 0, $2\pi$, $4\pi$, etc. Looking more specifically at FIG. 2 the problem can be appreciated if we imagine getting a $\phi$ of zero at $f_0$ and a $\phi$ of $2\pi$ at $f_1$. Since $2\pi$ would give the same indication on test equipment as zero, the carrier could not be identified unambiguously. The above problem can be avoided if $R_1$ and $R_2$ are selected such that they have no prime factors in common, for example $R_1:R_2 = 4:5$, $9:11$, $14:15$, etc. By selecting $R_1$ and $R_2$ in this manner each line near the carrier will have associated with it a unique phase difference not a multiple of $2\pi$ as shown in FIG. 2.

The radar receiver system of FIG. 3 provides a means of utilizing the above outlined theory to arrive at unambiguous Doppler information. The transmitted waveform, as shown in FIG. 5A, is a coherent pulse train the same as used in conventional staggered PRF MTI radar. The gate 11 of FIG. 3 operates to switch successive pulses along different paths to filters 12 and 13. The filters are tuned to the same line of the received spectrum. Phase meter 14 constantly monitors the phase difference between the outputs of filters 12 and 13. Threshold circuits 15 and 16 can be employed as a means of displaying only those signals of a preselected strength. This can be accomplished by means of coincidence gating in the processing circuitry 17. The task of the processing circuitry is to combine the signals which are above a preselected value with the phase information to obtain unambiguous Doppler or to monitor only those signals with a preselected Doppler shift. Another possibility would be to display rapidly approaching targets on a separate screen. The system of FIG. 3 will allow a spectrum $S_1$ of FIG. 2(A) to be set up in one channel and the spectrum $S_2$ to be present in the other channel. Due to the staggering of the transmitted pulses, these spectra will have a phase shift represented by $2\pi (f-f_0) R_1$ of FIG 2. By tuning each filter 12 and 13 to the same line in each train a phase difference is ascertained which can further be used, by means of the graph of FIG. 2 to determine the separation between the filter frequency and the unknown carrier frequency. With the carrier frequency of the return wave known, the Doppler shift can be calculated by finding the difference between the transmitted carrier and the return carrier.

Using as staggering ratio of $R_1:R_2 = 4:5$ the following table of values of $\phi$ in degrees units versus carrier frequency plus a certain number of PRF's, can be calculated.

TABLE

| | | |
|---|---|---|
| 0 degrees | Signal carrier equals filter resonant frequency. | |
| −160 degrees | do | Plus 1 PRF. |
| 40 degrees | do | Plus 2 PRF. |
| −120 degrees | do | Plus 3 PRF. |
| 80 degrees | do | Plus 4 PRF. |
| 160 degrees | do | Minus 1 PRF. |
| −40 degrees | do | Minus 2 PRF. |
| 120 degrees | do | Minus 3 PRF. |
| −80 degrees | do | Minus 4 PRF. |

By using the above data the phase meter 14 of FIG. 3 could be suitably labeled to read out the target velocity directly.

FIG. 4 shows a more complete system incorporating the invention. The system uses a set of range gates 19 and a set of pairs of narrowband filters after each range gate. The numbering of the phase monitoring and threshold circuits is the same as shown in FIG. 3 and like components perform the same function as described in reference to FIG. 3. The system of FIG. 4 is arrived at by a modification of FIGS. 4–5, p. 117 of "Introduction to Radar Systems," by M. I. Skolnik where an explanation of the operation of the conventional parts of the system can be obtained. The variable delay line 21 is kept as close as feasible to the signal round trip time by means of the control loop between tracking range gate 19 and the delay 21. In the figure shown, each tracking gate would be followed by a pair of narrowband filter banks, with as many filters in each blank as the number of distinguishable Dopplers within one PRF interval. The tracking radar may be converted into a search radar by replacing the range gates and narrowband filters by matched filters.

The transmitted waveform may also be a non-coherent staggered pulse train, as generated by a pulsed magnetron oscillator, e.g. if care is taken to restoring coherency in the received signal, by locking the phase of the coho to the phase of each transmitted pulse. In the invention described the time between pulses must be such that unambiguous range on the targets of interest is available, otherwise the switching operation will not perform properly.

It is obvious to one skilled in the art that several uses of the invention are possible. For example the system may be constructed to display only those targets within preselected velocity brackets, or to discriminate between approaching and receding targets or to display rapidly moving targets on a separate screen. The principles of the invention are equally applicable to sonar systems.

Numerous and varied arrangements embodying the principles of the invention of which the above described embodiment is illustrative will readily occur to those skilled in the art. No attempt to exhaustively illustrate all possible such arrangements has been made.

What is claimed and desired to be secured by Letters Patent of the United States is:

1. A pulse-echo system comprising:
   transmitter means for generating a plurality of pulse trains modulated on a common carrier at the same pulse rate frequency and separated in the time domain, the spectra of said pulse trains being composed of frequency lines located at said carrier and on each side of said carrier at frequency intervals equal to said pulse rate frequency, and
   means for receiving Doppler shifter reflections of said trains including, means for measuring the phase difference between a preselected frequency line in each of said reflected trains.

2. The system of claim 1 wherein said measuring means comprises:
   gating means for directing each of said trains along a separate channel,
   filter means located in each of said channels for passing only the same preselected frequency line of each of said reflected trains, and
   phase measuring means coupled to said filter means for generating a signal equal to the phase difference between said preselected frequency lines.
   whereby said signal indicates the separation between said frequency line and the carrier frequency of said return trains.

3. The system of claim 2 further including:
   means coupled to said phase measuring means for permitting further processing of said return pulse trains for preselected values of said signal.

4. The system of claim 2 further including:
   threshold means located in said channels for passing said filter output signals when the amplitude of said reflected trains is above a preselected value,
   means for permitting further processing of said reflected trains upon the simultaneous occurrence of a preselected value of said signal and a return pulse of a preselected amplitude.

5. The system of claim 1 wherein said transmitter means further includes:
   means for separating said trains in time by an amount different than one half the reciprocal of the pulse rate frequency.

6. The system of claim 5 wherein said transmitter means generates two said trains, each pulse of a first train being adjacent in time to pulses of the other train and the time separations between any three adjacent pulses having no prime factors in common.

References Cited

UNITED STATES PATENTS

| | | | |
|---|---|---|---|
| 2,746,033 | 5/1956 | Bachmann | 343—7.7 |
| 3,031,659 | 4/1962 | Parquier | 343—7.7 |
| 3,382,496 | 5/1968 | Matsukasa et al. | 343—7.7 |

RODNEY D. BENNETT, Jr., Primary Examiner

MALCOLM F. HUBLER, Assistant Examiner

U.S. Cl. X.R.

343—7.7, 17.1